United States Patent [19]
Corte et al.

[11] B 3,994,719
[45] Nov. 30, 1976

[54] RESINS FOR SEPARATING HEAVY METALS CONSISTING OF THIOUREA-GROUP-CONTAINING MACROPOROUS VINYL AROMATIC CROSSLINKED MATRIXES

[75] Inventors: Herbert Corte, Opladen; Harold Heller, Cologne; Michael Lange; Otto Netz, both of Leverkusen, all of Germany

[73] Assignee: Bayer Aktiengesellschaft, Germany

[22] Filed: Mar. 20, 1974

[21] Appl. No.: 452,938

[44] Published under the second Trial Voluntary Protest Program on February 17, 1976 as document No. B 452,938.

[30] Foreign Application Priority Data
Mar. 24, 1973 Germany............................. 2314756
Dec. 22, 1973 Germany............................. 2364368

[52] U.S. Cl.............................. 75/101 BE; 423/22; 423/23; 423/100; 260/2.2 R; 260/2.1 C; 260/2.2 C; 260/79.5 NV; 75/118 R; 75/121

[51] Int. Cl.$^2$......................................... C08F 27/02
[58] Field of Search................ 260/2.2 R, 79.5 NV, 260/2.1 C; 210/38

[56] References Cited
UNITED STATES PATENTS

| | | | |
|---|---|---|---|
| 2,890,180 | 6/1959 | Cerny et al. ................ | 260/79.5 NV |
| 3,847,481 | 11/1974 | Motani et al..................... | 260/2.2 R |
| 3,892,688 | 7/1975 | Motani et al..................... | 260/2.2 R |
| 3,892,689 | 7/1975 | Motani et al..................... | 260/2.2 R |

FOREIGN PATENTS OR APPLICATIONS
2,312,233   4/1973   Germany

*Primary Examiner*—Harry Wong, Jr.
*Assistant Examiner*—Peter F. Kulkosky
*Attorney, Agent, or Firm*—Connolly and Hutz

[57] ABSTRACT

The invention concerns new, crosslinked, macroporous, vinyl-aromatic plastic materials containing thiourea groups, to processes for their production and to their use for adsorbing metal compounds, especially noble metal and mercury compounds.

16 Claims, No Drawings

RESINS FOR SEPARATING HEAVY METALS CONSISTING OF THIOUREA-GROUP-CONTAINING MACROPOROUS VINYL AROMATIC CROSSLINKED MATRIXES

This invention relates to new, crosslinked, macroporous, vinyl-aromatic plastic materials containing thiourea groups, to processes for their production and to their use for adsorbing metal compounds, especially noble metal and mercury compounds.

German Offenlegungsschrift No. 2,312,233 describes non-crosslinked, vinyl-aromatic polymers, for example polystyrene resins, containing as functional groups amino groups and thiourea groups of the formula —NHCSNHR, in which R can be a hydrogen atom, or an alkyl, aryl or acyl radical. Their use for removing heavy metal ions from solutions is also described in the German Offenlegungsschrift No. 2,312,233. Unfortunately, the adsorption capacity of these synthetic resins in the highly acidic pH range is far from satisfactory, and undesirable large quantitis of heavy metals, for example mercury, remain in the solutions (see German Offenlegungsschrift 2,312,233, page 10). The plastic materials according to the invention do not have these disadvantages. Also at a pH-value of 0 they do adsorbe still large quantities of e.g. mercury or silver compounds whereby the residue of mercury respectively silver compounds remaining in the treated solutions is extremely low.

The present invention relates to thiourea group containing synthetic resins of a crosslinked, macroporous, vinyl-aromatic base polymer of monovinyl and polyvinyl compounds, which has a pore volume of from 20 to 80 % by volume, preferably from 30 to 60 % by volume, and a specific surface of from 10 to 500 m²/g, preferably from 20 to 200 m²/ g, and at least 10 % of whose aromatic nuclei are substituted by 1 to 3 functional groups corresponding to the general formulae:

(I) 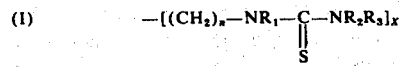

(II) 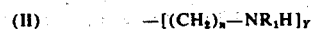

and/or (III) 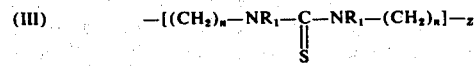

in which formulae,

X, Y and Z are independently of another are 0, 1, 2 or 3;

$n$ is 0, 1 or 2;

$R_1$, $R_2$ and $R_3$ independently of one another, each represent a hydrogen atom, a linear or branched $C_1$-$C_6$-alkyl-, $C_2$-$C_6$-alkenyl-, $C_5$-$C_6$-cycloalkyl radical or an aryl or aralkyl radical optionally substituted by $C_1$-$C_3$-alkyl, alkoxy or halogen; and whereby in the case that X, Y and Z are different from 0 the proportion of (I) is from 1 to 95%, preferably from 10 to 60%, the proportion of (II) is from 98 to 4%, preferably from 85 to 10%, and the proportion of (III) is from 1 to 95%, preferably from 5 to 80%, and in the case that Z is = 0 the proportion of (I) is from 5 to 100% and the proportion of (II) is from 95 to 0%; based on the sum total of the functional groups.

$C_1$-$C_6$- and $C_1$-$C_3$-alkyl radicals include methyl, ethyl, propyl, butyl, pentyl and hexyl, methyl, ethyl and propyl being preferred.

Examples of $C_2$-$C_6$-alkenyl radicals include allyl, propenyl and butenyl, allyl being preferred.

$C_5$-$C_6$-cycloalkyl radicals include cylopentyl and cyclohexyl.

The following are mentioned as examples of optionally substituted aryl or aralkyl radicals: phenyl, benzyl, naphthyl, tolyl, o-chlorophenyl, p-hydroxyphenyl, p-ethoxyphenyl and methoxyphenyl.

According to the invention, preferred synthetic resins are those which have a porosity of from 30 to 60% by volume and a surface of from 20 to 200 m²/g, and in which the proportion of functional groups corresponding to general formula (I) is from 5 to 100%, preferably from 10 to 90%, the proportion of functional groups corresponding to general formula (II) is from 95 to 0%, preferably from 90 to 10%, based on the total quantity of functional groups, and in which $n = 1$ and $R_1 = R_2 =$ hydrogen, whilst $R_3$ represents methyl, phenyl, allyl or benzyl.

According to the invention, other preferred synthetic resins are those which have a porosity of from 30 to 60% by volume, and a surface of from 20 to 200 m²/g, and in which the proportion of functional groups corresponding to general formula (I) is from 5 to 100%, preferably from 10 to 60%, the proportion of functional groups corresponding to general formula (II) is from 95 to 0%, preferably from 90 to 40%, based on the total quantity of functional groups, and in which $n = 1$ and $R_1 = R_2 = R_3 =$ hydrogen.

Especially preferred synthetic resins according to the invention are those which have a porosity of from 30 to 60% by volume and a surface of from 20 to 200 m²/g and in which the proportion of functional groups corresponding to general formula (III) is from 5 to 90%, preferably from 50 to 90%, the sum total of the proportions of general formulae (I) and (II) being from 95 to 10%, preferably from 50 to 10% of the total quantity of functional groups, and in which $n = 1$ and $R_1 = R_2 = R_3 =$ hydrogen.

The synthetic resins according to the invention are suitable for adsorbing metal compounds from solutions and, in this respect, are distinguished by their high adsorption capacity for metal compounds, especially mercury and noble metal compounds, and by their high adsorption rate and their outstanding mechanical stability, coupled with an excellent hydrodynamic behaviour. In particular, they can also be used advantageously in large industrial filters.

An advantage of the synthetic resins according to the invention over those described in German Offenlegunsschrift No. 2, 312, 233 is in particular the fact that the synthetic resins according to the invention still adsorb large quantities of mercury and silver compounds, even at a pH value of 0, whilst the synthetic resins described in German Offenlegungsschrift No. 2, 312,233 show little or no adsorption capacity for metal ions of this kind under comparable conditions. In addition, it is possible with the synthetic resins according to the invention almost completely to remove mercury compounds, for example from aqueous solutions, in a single stage at high filtration rates, both in cases where a stationary filter bed is used and in cases where a fluidized bed is used. The synthetic resins according to the invention are also distinguished by their high resistance to alkalis. Thus, for example, they are attacked by 10 % sodium hydroxide solution only at boiling point, and this only relatively slowly.

Macroporous base polymers of monovinyl and polyvinyl compounds are known per se. They are produced by methods known per se, i.e., by subjecting the corresponding monovinyl and polyvinyl compounds to block or suspension polymerisation in the presence of a solvent or of high molecular compounds. The production of macroporous base polymers is described, for example, by j.Seidel et al in Adv. Polym. Sci., Vol. 5, 1967, pages 113 et seq. Bead-form macroporous base polymers, of the kind obtained in a conventional manner by suspension polymerisation, are preferred.

The following are mentioned as examples of suitable monovinyl aromatic compounds which can be used either individually or in admixture with one another, styrene, substituted styrenes such as methylstyrene, dimethylstyrene, ethylstyrene, chlorostyrene, vinylanisole, α-methylstyrene and vinylnaphthalene.

The following are mentioned as examples of suitable polyvinyl compounds which can be used either individually or in admixture with one another: divinylbenzene, divinylpyridine, divinyltoluenes, divinylnaphthalenes, diallylphthalate, ethyleneglycol diacrylate, ethyleneglycol dimethacrylate, divinylxylene, divinylethylbenzene, divinylsulphone, polyvinyl or polyallyl ethers of glycol, glycerol and pentaerythritol, divinylketone, divinylsulphide, allylacrylate, diallylmaleate, diallylfurmarate, diallylsuccinate, diallycarbonate, diallylmalonate, dialyloxalate, diallyladipate, diallylsebacate, divinylsebacate, diallyltartrate, diallylsilicate, triallyltricarbally-late, triallylaconitate, triallylcitrate, triallylphosphate, N,N′-methylene diacrylamide, N,N′-methylene dimethacrylamide, N,N′-ethylene diacrylamide, 1,2-di-(α-methyl-methylenesulphonamido)-ethylene, trivinylbenzene, trivinylnaphthalene, polyvinylanthracenes and trivinylcyclohexane, and also isoprene, butadiene, piperylene, pentadiene, hexadiene, octadiene, decadiene, hexatriene, cyclopentadiene and their substitution products, for example chloroprene, 2,3-dimethylbutadiene, 2,5-dimethylhexadiene and 2,5-dimethyloctadiene.

Preferred aromatic monovinyl compounds include styrene, vinyltoluene, and vinylnaphthalene, whilst preferred polyvinyl compounds are divinylbenzene and trivinylbenzene.

For technical reasons there is often used commercial-grade divinylbenzene containing up to 40 to 50% by weight of ethylstyrene, instead of pure divinylbenzene. The macroporous base polymers described in the following, and obtained by polymerising a monovinyl compound with divinylbenzene, are obtained in most cases from commercial-grade divinylbenzene and, contain therefore in addition to units of divinylbenzene, units of ethylstyrene It is also possible to use macroporous base polymers which, in addition to the monovinyl and polyvinyl compounds referred to above, contain other vinyl compounds such as, for example, methacrylic and acrylic compounds, especially acrylonitrile, ethylene, propylene, isobutylene, vinylchloride, vinylacetate, vinylidene chloride, vinylpyridine and substituted vinylpyridines, and also vinylquinolines and vinylpyrrolidone.

The quantity in which the polyvinyl compounds are present in the macroporous base polymer can vary within wide limits. In general, the polyvinyl compound content is from 1 to 50% by weight, based on the monomer total, a content of from 2 to 30% by weight being preferred. The vinyl compounds described above as additives are also generally used in quantities of from 1 to 50% by weight, based on the monomer total, quantities of from 2 to 15% by weight being preferred.

Particularly suitable macroporous base polymers consist of from 50% to 98% of styrene, vinyltoluene, vinylanisole or ethylstyrene, and from 50% to 2% of divinylbenzene or trivinylbenzene, macroporous base polymers of from 85% to 98% of styrene and from 15% to 2% of divinylbenzene being preferred.

Unless the macroporous base polymer already contains primary and/or secondary amino groups resulting from the use of corresponding aromatic monovinyl compounds e.g. of p-vinyl-benzylamine, primary and-/or secondary amino groups are introduced into the base polymer by methods known per se. The introduction of these amino groups into the base polymer is known; reference is made, for example, to the introduction of groups if this kind by chloromethylation and subsequent amination (U.S. Pat. No. 2,629,710), or by chloromethylation and subsequent reaction with potassium phthalimide (British Patent No. 767,821), or by amidomethylation and subsequent hydrolysis (British Patent No. 867,449 (= U.S. Pat. No. 3,006,866). In addition, the introduction of groups of the kind in question is described in German Patent No. 1,045,102.

Macroporous base polymers containing primary amino groups can also be obtained by nitrating, for example, a macroporous base polymer of styrene and a polyvinyl compound, and reducing the products of nitration. This method of production is also known and is described, for example, in British Patent No. 900,037.

Other preferred macroporous base polymers are those which contain more than one amino group per aromatic nucleus of the base polymer, and which contain almost exclusively primary araliphatic amino groups. They are obtained by known methods, for example by reacting the macroporous base polymer with bis-(phthalimidomethyl)-ether, and hydrolysing the reaction products thus obtained (see German Offenlegungsschrift No. 2,215,956). The synthetic resins such obtained are distinguished by a particularly high-capacity.

The synthetic resins according to the invention are produced by reacting the macroporous base polymer containing primary and/or secondary amino groups with thiocyanic acid, salts of thiocyanic acid, isothiocyanates or with optionally substituted thioureas.

The reaction with thiocyanic acid or isothiocyanates is generally carried out by suspending the macroporous base polymer containing primary and/or secondary amino groups in a suspending agent, adding the thiocyanic acid or the isothiocyanate to the suspension and subsequently heating the reaction mixture while stirring. It is also possible initially to charge the macroporous base polymer containing amino groups to saturation with thiocyanic acid, in a filter tube, to suspend the macroporous base polymer thus charged in water or dilute thiocyanic acid and to heat the suspension while stirring.

In both methods, it has proved to be advantageous, where thiocyanic acid is used, to select the acidity of the suspension not greater than 0.01 mol/l of thiocyanic acid. The acidity can also be adjusted to higher than 0.01 mol/l, for example to between 0.1 and 2 mol/l of thiocyanic acid, although in this case the reaction products obtained are increasingly contaminated by conversion products of the thiocyanic acid, so that the reaction products have to be purified in an additional stage.

In cases where the macroporous base polymer containing primary and/or secondary amino groups is reacted with salts of thiocyanic acid, or with optionally substituted thioureas, the macroporous base polymer containing amino groups is generally first converted into the salt form in conventional manner with an acid, for example a mineral acid, such as dilute hydrochloric or sulphuric acid, and is then suspended in a suspending agent together with a salt of thiocyanic acid or with the particular, optionally substituted thiourea, and the suspension is heated while stirring. The pH value of the suspension should not be any lower than 0 and should be in the range of from 0 to 8, preferably in the range of from 2 to 7.

In addition, the macroporous base polymer containing amino groups can be suspended in a suspending agent directly with the particular salt of thiocyanic acid or with the optionally substituted thiourea, and the suspension heated while stirring.

The reaction time is largely governed by the reaction temperature and by the type of base polymer used.

The quantity of thiocyanic acid, thiocyanic acid salts, isothiocyanates or optionally substituted thioureas used can vary within wide limits. Thus it is possible to use equimolar quantities of thiocyanic acid, thiocyanic acid salts, isothiocyanates or optionally substituted thioureas, based on the quantity of amino groups present in the base polymer, or an excess of thiocyanic acid, thiocyanates, thioureas or isothiocyanates, for example a 15-fold excess. However, the thiocyanic acid, thiocyanates, optionally substituted thioureas or isothiocyanates are generally used in a quantity of from 1 to 2 mols per mol of amino group present in the base polymer. It is also possible to use a deficit of thiocyanic acid, thiocyanate, optionally substituted thiourea or isothiocyanate, in which case the synthetic resins obtained contain appreciable quantities of functional groups of the general formula (II) in addition to the functional groups of the general formula (I) and, optionally, of the general formula (III).

The temperature at which the reaction is carried out is largely governed by the type of structure of the macroporous base polymer containing primary and/or secondary amino groups which is used. Thus, the temperatures required in the case of macroporous base polymers containing primary aromatic amino groups are generally lower than those required in the case of base polymers containing primary araliphatic amino groups. In general, the reaction is carried out at temperatures of from 80° to 200°C, preferably at temperatures of from 100° to 180°C.

In cases where isothiocyanates are used, the reaction is advantageously carried out at temperatures of from 10° to 100°C, preferably at temperatures of from 20° to 80°C.

Examples of suitable suspending agents include liquids or mixtures of liquids which are inert with respect to the reactants under the reaction conditions, for example water, methanol, ethanol, toluene, chlorobenzene and mixtures of organic liquids such as, for example, ethanol-toluene or toluene-chlorobenzene.

Preferred suspending agents are liquids of the kind which, on the one hand, act as swelling agents for the macroporous base polymer containing amino groups and, on the other hand, are solvents for thiocyanic acid, thiocyanates, thioureas or isothiocyanates. Water, ethanol and dioxan are mentioned by way of example.

In general, suitable thiocyanic acid salts include both inorganic and organic thiocyanates. In the case of inorganic thiocyanates, those salts with metals of Groups 1 to 3 of the Periodic System are particularly suitable, whilst in the case of organic thiocyanates those salts with organic bases, such as aliphatic and aromatic amines and their quaternary ammonium salts, are particularly suitable. Alkali metal thiocyanates and ammonium thiocyanate are particularly preferred. Lithium thiocyanate, sodium thiocyanate, potassium thiocyanate, magnesium thiocyanate, calcium thiocyanate and aluminium thiocyanate are mentioned by way of example.

Examples of suitable organic thiocyanates include methyl and ethyl ammonium thiocyanate, benzylammonium thiocyanate and dimethylammonium thiocyanate.

In addition, it is also possible to use mixtures of these inorganic and organic thiocyanates, for example ammonium thiocyanate/benzylammonium thiocyanate, sodium thiocyanate/benzylammonium thiocyanate and potassium thiocyanate/benzylammonium thiocyanate.

The quantitative ratio of the constituents in these mixtures is by no means critical and can fluctuate within wide limits. The ratio influences the ratio of the substituents I : II : III.

Suitable optionally substituted thioureas include compounds corresponding to the general formula (IV):

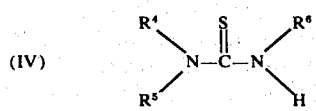

(IV)

in which $R^4$, $R^5$ and $R^6$, independently of one another, each represent a hydrogen atom, a linear or branched $C_1$- to $C_6$-alkyl radical or an aryl, aralkyl or acyl radical optionally substituted by halogen, hydroxy or alkoxy.

Examples of suitable linear or branched $C_1$-$C_6$-alkyl radicals include methyl, ethyl, propyl, butyl, pentyl, hexyl, isopropyl and amyl.

The following are mentioned as examples of aryl radicals optionally substituted by halogen, alkoxy and hydroxy: phenyl, benzyl, napthyl, tolyl, o-chlorophenyl, p-hydroxyphenyl and p-ethoxyphenyl.

Acetyl, propionyl and benzoyl are mentioned as examples of acyl radicals.

The following are mentioned as examples of individual compounds: N-methylthiourea, N-ethylthiourea, N-isopropylthiourea, N-(n-butyl)-thiourea, N-phenylthiourea, N-benzylthiourea, N-naphthylthiourea, N-tolylthiourea, N-(o-chlorophenyl)-thiourea, N-(p-hydroxyphenyl)-thiourea, N-(p-ethoxyphenyl)-thiourea, N-(2,4-dimethylphenyl)-thiourea, N-acetylthiourea, N-benzoylthiourea, N,N-dimethylthiourea, N,N-diethylthiourea, N,N-dipropylthiourea, s-dimethylthiourea, s-diisopropylthiourea, s-di-n-butylthiourea, s- diphenylthiourea, s-ditolylthiourea, N,N-phenyltolylthiourea, N,N,N'-trimethylthiourea, N,N,N'-triethylthiourea and N,N,N'-tripropylthiourea.

Suitable isothiocyanates include alkyl isothiocyanates having from 1 to 6 carbon atoms, preferably from 1 to 3 carbon atoms, in the alkyl radical, for example methylisothiocyanate, ethylisothiocyanate, n-butylisothiocyanate, N-pentylisothiocyanate, n-hexylisothiocyanate or alkenyl isothiocyanates with 2 to 6 carbon atoms in the alkenyl radical, for example allyl and butenyl isothiocyante; cycloalkyl isothiocyanates with 5 to 6 carbon atoms in the cycloalkyl radical, for example cyclopentyl isothiocyanate and cyclohexyl isothiocyanate; aryl and aralkyl isothiocyanates optionally substituted by $C_1$- to $C_3$-alkyl and alkoxy radicals or halogen, for example phenyl isothiocyanate, benzyl isothiocyanate, chlorophenyl isothiocyanate, tolyl isothiocyanate, 2,4-dimethylphenyl isothiocyanate and 3-methoxyphenyl isothiocyanate. It is particularly preferred to use methyl isothiocyanate, allyl isothiocyanate, phenyl isothiocyanate and benzyl isothiocyanate.

The proportions of the functional groups (I), (II) and (III) present in the synthetic resins according to the invention can be determined by methods known to the expert. They are determined from the elemental analyses of the macroporous base polymer containing primary and/or secondary amino groups used and the reaction product obtained. Porosity and surface are also determined by known methods. In general, they are determined in a conventional manner with a mercury porosimeter (porosity) and by the BET-method (surface), cf. J. Seidel et al in Adv. Polym. Sci., Vol. 5, 1967, pages 113 et seq.

The synthetic resins according to the invention are used for adsorbing metal compounds in the manner normally adopted for ion exchangers, for example by filling a column with the synthetic resins according to the invention and charging the column thus filled with the solution to be worked up. The column can be charged either from beneath or from above. Similarly, the filter bed can be in the form of a fixed bed or in the form of a fluidized bed. The synthetic resins according to the invention are particularly suitable for adsorbing silver, mercury and gold compounds, and for adsorbing compounds of the platinum metals such as palladium, platinum, iridium and rhodium. The solutions to be worked up can contain these ions either individually or in admixture. The concentration of the metal compounds in the solutions to be worked up is by no means critical and can fluctuate within wide limits. The same applies as regards the pH value of the solutions to be worked up.

The invention is illustrated in the following Examples. In the following Examples there are used for the preparation for the resins of the present invention as vinylaromatic base polymer containing primary and/or secondary amino groups weakly basic anion exchangers. These anion exchangers were obtained by introducing primary and/or secondary amino groups into macroporous, crosslinked vinylaromatic base polymer of known porosity, surface and crosslinking. For crosslinking there was used technical grade divinylbenzene (60% divinylbenzene, 40% ethylbenzene).

EXAMPLE 1

1000 ml of a macroporous, weakly basic anion exchanger containing primary amino groups (HCl binding capacity 2.75 val) (val = gram equivalent) prepared in accordance with British Patent No. 867,449 (= U.S. Pat. No. 3,006,866) by aminomethylating a styrene bead polymer crosslinked with 5% of divinylbenzene and made porous by addition of 65% by weight (based on the monomer mixture) of a $C_{12}$-hydrocarbon mixture (porosity: 47% by volume; surface: 65 $m^2/g$), were washed in a filter tube, first with water and then with ethanol (technically absolute) until the effluent contained only 0.3% of water. 1635 ml of anion exchanger resin swollen in ethanol were isolated.

600 ml of the anion exchanger thus pretreated were suspended in 500 ml of ethanol, and heated for 8 hours to 80°C following the addition of 109 g of allyl isothiocyanate (1.1 mol). The reaction product was washed with ethanol and with fully desalted water.

Yield: 460 ml of synthetic resin. Thiourea group content: 2.14 m mol/ml Amino group content: 0.1 m mol/ml Elemental analysis: 69.15% C; 11.45% N; 12.8% S.

Determining adsorption capacity for silver from 1 N nitric acid:

25 ml of the synthetic resin thus produced were poured into a filter tube with an internal diameter of 13 mm and were subsequently precharged (conditioned) by passing over an excess of 1 N nitric acid. The resin sample thus pretreated was then charged to equilibrium with a 0.1 N silver nitrate solution in 1 N nitric acid. The filtration rate amounted to 200 ml per hour. The filter effluent was tested by titration in portions for its metal content and the adsorption capacity of the resin was calculated from the quantity of metal introduced and the quantity of metal measured in the filter effluent. The silver absorption amounted to 2.99 m val/ml of resin.

EXAMPLE 2

200 ml of macroporous, weakly basic anion exchanger swollen in ethanol, as used in Example 1, were reacted with 67.5 g of phenyl isothiocyanate instead of allyl isothiocyanate (0.5 mol) at 50°C, and were further processed in the same way as described in Example 1.

Yield: 172 ml of synthetic resin
Thiourea group content: 1.87 m mol/ml
Amino group content: 0.1 m mol/ml
Elemental analysis: 72.1% C; 9.6% N; 10.8% S.

The silver absorption of the resin, determined as described in Example 1, amounted to 2.33 m val/ml of resin.

EXAMPLE 3

1000 ml of a macroporous weakly basic anion exchanger containing primary amino groups (HCl binding capacity 2.4 val), produced in accordance with British Patent No. 867,449 (= U.S. Pat. No. 3,006,866) by aminomethylating a styrene bead polymer crosslinked with 8% of divinylbenzene and made porous by the addition of 60% (based on the monomer mixture) of a $C_{12}$-hydrocarbon mixture (porosity: 44% by volume; surface: 110 $m^2/g$), were suspended in 500 ml of fully desalted water, stirred for 16 hours at 30°C following the addition of 105 g of methyl isothiocyanate (1.44 mol) and the product was worked up in the same way as described in Example 1.

Yield: 1150 ml of synthetic resin
Thiourea group content: 1.18 m mol/ml
Amino group content: 0.9 m mol/ml
Elemental analysis: 70.85% C; 11.25% N; 9.35% S.

The mercury absorption of the resin, determined as described in Example 1 with a 0.1 N mercury nitrate solution (in 1 N nitric acid), amounted to 2.64 m val/ml of resin.

EXAMPLE 4

1000 ml of the macroporous weakly basic anion exchanger used in Example 3 were reacted with 35 g of methyl isothiocyanate (0.48 mol) and the reaction product was further processed in the same way as described in Example 3.

Yield: 1175 ml of synthetic resin Thiourea group content: 0.4 m mol/ml Amino group content: 1.6 m mol/ml Elemental analysis: 77.2% C; 9.35% N; 3.35% S.

The mercury absorption of the resin determined as described in Example 1 by using a 0,1 N mercury nitrate solution in 0.1 N nitric acid, amounted to 3,16 m val/ml of resin.

EXAMPLE 5

625 ml of a macroporous weakly basic anion exchanger containing primary amino groups (HCl binding capacity 1.62 val), produced in accordance with German Patent No. 1,054,715 by aminomethylating a styrene bead polymer crosslinked with 5% of divinylbenzene and made porous by the addition of 65% by weight (based on the monomer mixture) of a $C_{12}$-hydrocarbon mixture, were charged to equilibrium with approximately 1 N thiocyanic acid in a filter tube. After the excess acid had been washed out with water, 1000 ml of the anion exchanger thus charged were isolated in the thiocyanate form, suspended in 500 ml of fully desalted water and heated for 7 hours to 180°C in an autoclave. After cooling, the reaction product obtained was washed in a filter tube with fully desalted water, 2% sodium hydroxide (until the effluent was substantially free from thiocyanate ions) and again with fully desalted water (until the effluent was neutral).

Yield: 645 ml of synthetic resin
Thiourea group content: 1.05 m mol/ml
Amino group content: 0.6 m mol/m
Elemental analysis: 73.9% C; 9.25% N; 8.25% S.

Determining adsorption capacity for silver from nitric acid of differing normality (procedure as described in Example 1):

| Charging solution:0.1 N silver nitrate in | silver adsorption m val/ml resin |
|---|---|
| 0.01 N nitric acid | 1.4 |
| 0.1 N nitric acid | 1.5 |
| 1.0 N nitric acid | 1.65 |

EXAMPLE 6

300 ml of the macroporous anion exchanger used in Example 5 (HCl binding capacity 0.78 val) were suspended in 450 ml of fully desalted water and converted into the HCl form by the addition of 0.78 val of hydrochloric acid. After 30 minutes, 118.5 g of ammonium thiocyanate (1.56 mol) were added, and the suspension was heated for 8 hours to 140°C in an autoclave. The reaction product was treated in the same way as described in Example 5.

Yield: 355 ml of synthetic resin
Thiourea group content: 1.0 m mol/ml
Amino group content: 0.4 m mol/ml Elemental analysis: 73.05% C; 9.2% N; 8.7% S.

Determining adsorption capacity for silver and mercury:

a. The adsorption capacity from 0.1 N silver or mercury nitrate solution (in 1 N nitric acid in each case), as determined in accordance with Example 1, amounted to 1.6 m val/ml of resin in the case of silver and to 2.34 m val/ml of resin in the case of mercury.

b. After the resin had been precharged with 1 N sodium chloride solution, mercury absorption from 0.1 N mercury chloride solution (in 1 N sodium chloride) amounted to 2.48 m val/ml of resin. When the reaction was carried out at 120°C instead of 140°C, the yield was: 352 ml of synthetic resin. Thiourea group content: 1.12 m mol/ml Amino group content: 0.55 m mol/ml; Elemental analysis: 73.45% C; 9.25% N; 8.5% S. The adsorption capacity for mercury from 0.1 N mercury nitrate solution in 1 N nitric acid amounted to 2.7 m val/ml of resin, and in 0.1 N nitric acid 3.8 m val/ml of resin.

EXAMPLE 7

300 ml of the macroporous anion exchanger used in Example 5 (CHl binding capacity 0.78 val) were suspended in 450 ml of fully desalted water. After 30 minutes, 118.5 g of ammonium thiocyanate (1.56 mol) were added and the suspension was heated for 8 hours to 140°C in an autoclave. After cooling, the reaction product was treated in the same way as described in Example 5.

Yield: 330 ml of synthetic resin
Thiourea group content: 0.64 m mol/ml
Amino group content: 1.5 m mol/ml
Elemental analysis: 76.95% C; 9.3% N; 4.95% S.

EXAMPLE 8

300 ml of the macroporous anion exchanger used in Example 5 (HCl binding capacity 0.78 val) were suspended in 450 ml of fully desalted water and converted into the HCl form by the addition of 0.78 val of hydrochloric acid. After 30 minutes, 1.56 mol of potassium thiocyanate were added and the suspension was heated for 16 hours to 140°C in an autoclave. The reaction product obtained was treated in the same way as described in Example 5.

Yield: 325 ml of synthetic resin
Thiourea group content: 1.24 m mol/ml
Amino group content: 0.22 m mol/ml
Elemental analysis: 74.4% C; 8.4% N; 8.8% S.

EXAMPLE 9

The macroporous styrene bead polymer used in Example 5 for producing the anion exchanger resin was converted in accordance with German Offenlegungsschrift No. 2,215,956 into a weakly basic anion exchanger resin of the poly-(aminomethyl)-styrene type, resulting in a resin containing approximately 1.5 aminomethyl groups per aromatic nucleus.

290 ml of the anion exchanger resin thus obtained (HCl binding capacity 0.9 val) were suspended in 500 ml of fully desalted water and were converted into the HCl form by the addition of 0.9 val of hydrochloric acid. After 30 minutes, 137 g of ammonium thiocyanate were added, the reaction mixture was heated for 16 hours to 140°C and was subsequently worked up in the same way as described in Example 5.

Yield: 220 ml of synthetic resin
Thiourea group content: 1.95 m mol/ml

Amino group content: 0.3 m mol/ml
Elemental analysis: 65.6% C; 13.0% N; 13.8% S.

The silver absorption of the resin from 1 N nitric acid, determined in the same was as described in Example 1, amounted to 2.93 m val/ml. The mercury absorption was determined after precharging with 1 N sodium chloride solution from a solution of 0.1 N mercury chloride in 1 N sodium chloride. It amounted to 4.0 m val/ml of resin.

EXAMPLE 10

1000 ml of the macroporous weakly basic anion exchanger used in Example 5 were washed in a filter tube with ethanol (technical and absolute) until the eluate had a water content of 0.4%. 300 ml of the anion exchanger thus pretreated, with an acid-binding capacity of 0.5 val, were suspended in 500 ml of ethanol and, following the introduction of 24.5 g of sulphuric acid (100%) and 76 g of ammonium thiocyanate, were stirred for 8 hours at 140°C in an autoclave. The reaction product was further processed in the same way as described in Example 5.

Yield: 205 ml of synthetic resin
Thiourea group content: 1.4 m mol/ml
Amino group content: 0.4 m mol/ml
Elemental analysis: 71.0% C; 10.1% N, 10.1% S.

Determining adsorption capacity for silver and mercury (procedure as described in Example 1):

Amino group content: 0.2 m mol/ml
Elemental analysis: 73.55% C; 9.25% N, 10.05% S.

EXAMPLE 13

250 g of the macroporous styrene bead polymer used in Example 5 were nitrated and subsequently reduced in accordance with British Patent No. 900,037.

150 ml of the resulting macroporous anion exchanger resin of the poly-(aminostyrene)-type with an HCl binding capacity of 0.22 val were stirred for 30 minutes in 220 ml of 1 N hydrochloric acid and heated for 8 hours to 120°C in an autoclave following the addition of 40 g of ammonium thiocyanate. The reaction product was further processed in the same way as described in Example 5.

Yield: 128 ml of synthetic resin
Thiourea group content: 1.05 m mol/ml
Amino group content: 0.6 m mol/ml
Elemental analysis: 66.5% C; 11.35% N; 6.95% S.

EXAMPLE 14.

63 ml of a macroporous weakly basic anion exchanger with secondary amino groups (HCl binding capacity 0.125 val), produced in accordance with German Patent No. 1,495,762 by amidomethylating (with N-chlormethyl-N-methylacetamide) and subsequently hydrolysing a bead-form styrene polymer crosslinked with 4% of divinylbenzene and made porous by the

| Charging solution | 0.1 N AgNO$_3$ 0.01 N HNO$_3$ | 0.1 N AgNO$_3$ 0.1 N HNO$_3$ | 0.1 N Hg(NO$_3$)$_2$ 1 N HNO$_3$ | 0.1 N HgCl$_2$ 1 N NaCl |
|---|---|---|---|---|
| Metal adsorption m val/ml of resin | 1.82 | 2.2 | 2.74 | 2.46 |

EXAMPLE 11

300 ml of the anion exchanger swollen in ethanol, as described in Example 10, were washed with toluene in a filter tube until the effluent was substantially free from ethanol. The exchanger was then suspended in 400 ml of toluene and, following the addition of 25.0 g of sulphuric acid (100%) and 76 g of ammonium thiocyanate, was heated for 8 hours to 140°C in an autoclave. After cooling, the reaction product was washed with ethanol and then worked up in the same way as described in Example 5.

Yield: 200 ml of synthetic resin
Thiourea group content: 1.6 m mol/ml
Amino group content: 0.2 m mol/ml
Elemental analysis: 69.6% C; 10.15% N; 11.15% S.

EXAMPLE 12

150 ml of the macroporous anion exchanger resin used in Example 5 (HCl binding capacity 0.4 val) were suspended in 200 ml of fully desalted water and converted into the HCl form with 0.4 val of hydrochloric acid. After 30 minutes, 45.5 g of ammonium thiocyanate and 66.5 g of benzyl ammonium thiocyanate were added, and the suspension was heated for 16 hours to 140°C in an autoclave. After cooling, the reaction product was washed with 1 litre of ethanol in a filter tube and then worked up in the same way as described in Example 5.

Yield: 166 ml of synthetic resin
Thiourea group content: 1.45 m mol/ml addition of 60%, based on the monomer mixture, of a $C_{12}$-hydrocarbon mixture (porosity: 44% by volume; surface 45 m$^2$/g), were suspended in 150 ml of fully desalted water, after which the pH value of the suspension was adjusted to around 0.5 by the addition of 0.25 val of hydrochloric acid. After 60 minutes, 19 g of ammonium thiocyanate (0.25 mol) were added and the suspensions was heated for 16 hours to 160°C. The reaction product was isolated and worked up in the same way as described in Example 5.

Yield: 59 ml of synthetic resin
Thiourea group content: 0.2 m mol/ml
Amino group content: 1.6 m mol/ml
Elemental analysis: 81.05% C; 7.15%; N; 1.65% S.

EXAMPLE 15

1000 ml of the macroporous anion exchanger used in Example 5 were charged to equilibrium with 3% hydrochloric acid in a filter tube. After the excess acid had been washed out with water, 1730 ml of the anion exchanger charged with hydrochloric acid were isolated.

300 ml of the macroporous anion exchanger resin charged with hydrochloric acid (anion-exchange capacity 0.45 val) were suspended in 500 ml of fully desalted water, and heated for 8 hours to 180°C in an autoclave following the addition of 103 g of thiourea (1.35 mol). The reaction product was worked up in the same way as described in Example 5.

Yield: 230 ml of synthetic resin
Thiourea group content: 1.13 m mol/ml

Amino group content: 0.15 m mol/ml
Elemental analysis: 74.1% C; 8.1% N; 8.75% S.
Determining adsorption capacity for silver and mercury (procedure as described in Example 1):

| Charging solution | 0.1 N AgNO$_3$ 0.01 N HNO$_3$ | 0.1 N AgNO$_3$ 1.0 N HNO$_3$ | 0.1 N Hg(NO$_3$)$_2$ 1.0 N HNO$_3$ | 0.1 N HgCl$_2$ 1 N NaCl |
|---|---|---|---|---|
| Metal adsorption m val/ml of resin | 1.48 | 1.76 | 2.42 | 2.14 |

EXAMPLE 16

1000 ml of the macroporous weakly basic anion exchanger used in Example 5 with an HCl binding capacity of 2.6 val were suspended in 1000 ml of fully desalted water, and heated for 8 hours to 150° – 155°C in an autoclave following the addition of 600 g of thiourea (7.9 mols). After cooling, the reaction product obtained was washed in a filter tube successively with fully desalted water, 2% sodium hydroxide solution and again with fully desalted water (until the effluent was neutral).
Yield: 1070 ml of synthetic resin
Thiourea group content: 0.96 m mol/ml
Amino group content: 0.6 m mol/ml
Elemental analysis: 73.9% C; 8.95% N, 7.7% S.

EXAMPLE 17

1000 ml of the macroporous, weakly basic anion exchanger resin with primary amino groups used in Example 3 (HCl binding capacity 2.4 val) were heated for 40 hours to reflux temperature (110°C) in aqueous suspension together with 1630 g of thiourea. The pH value of the suspension was maintained at 4 – 7 by the addition in portions of a total of 2.1 val of hydrochloric acid. The reaction solution was then run-off while still warm and the reaction product was isolated and worked up in the same way as described in Example 5.
Yield: 1240 ml of synthetic resin
Thiourea group content: 0.46 m mol/ml
Amino group content: 1.4 m mol/ml
Elemental analysis: 76.5% C; 9.5% N; 4.3% S.
The mercury adsorption of the resin, determined as described in Example 1 with 0.1 N mercury nitrate solution in 0.1 N nitric acid amounted to 3.1 m val/ml of resin.

EXAMPLE 18

Approximately 1.35 aminomethyl groups per aromatic nucleus were introduced in known manner in accordance with DOS No. 2,215,956 into a styrene bead polymer crosslinked with 7% of divinylbenzene and made porous by the addition of 65% by weight, based on the monomer mixture, of a C$_{12}$-hydrocarbon mixture (porosity: 47% by volume; surface: 95 m$^2$/g). 200 ml of the anion exchanger resin thus obtained (HCl binding capacity 0.48 val) were suspended in 500 ml of fully desalted water, converted into the HCl form by the addition of 0.48 val of hydrochloric acid and heated for 16 hours at 160°C following the addition of 73 g of thiourea. The reaction product was worked up in the same way as described in Example 5.
Yield: 174 ml of synthetic resin
Thiourea group content: 1.33 m mol/ml
Amino group content: 0.3 m mol/ml
Elemental analysis: 68.85% C; 11.8% N; 12.1% S.

EXAMPLE 19

200 ml of the macroporous anion exchanger resin used in Example 5 (HCl binding capacity 0.52 val) were suspended in 400 ml of fully desalted water and converted into the HCl form by the addition of 0.52 val of hydrochloric acid. 140 g of methyl thiourea (1.56 mol) were then added, after which the suspension was heated for 8 hours to 180°C in an autoclave. After cooling, the reaction product was washed in a filter tube successively with ethanol, 2% sodium hydroxide solution and fully desalted water (until the effluent was neutral).
Yield: 200 ml of synthetic resin
Thiourea group content: 1.58 m mol/ml
Amino group content: 0.1 m mol/ml
Elemental analysis: 73.4%C; 9.05% N; 10.0% S.
The silver absorption of the resin, determined as described in Example 1, amounted to 2.0 m val/ml.

EXAMPLE 20

200 ml of the macroporous anion exchanger used in Example 5 were converted into the HCl form in the same way as described in Example 19. Following the addition of 158 g of phenyl thiourea (1.04 mol), the suspension was heated for 8 hours to 160°C in an autoclave and was subsequently worked up in the same way as described in Example 19.
Yield: 210 ml of synthetic resin
Thiourea group content: 1.54 m mol/ml
Amino group content: 0.1 m mol/ml
Elemental analysis: 72.9% C; 9.0% N; 10.0% S.

EXAMPLE 21

1000 ml of the macroporous, weakly basic anion exchanger resin with primary amino groups used in Example 3 (HCl binding capacity 2.4 val) were washed with ethanol (technical and absolute) in a filter tube until the effluent contained only 0.2% of water. 1330 ml of the anion exchanger swollen in ethanol were then isolated.
300 ml of the exchanger resin thus pretreated were suspended in 500 ml of ethanol, and 155 g (0.825 mol) of N,N'-di-n-butylthiourea were added, followed by heating for 8 hours to 160°C in an autoclave. The reaction product was purified in the same way as described in Example 19.
Yield: 235 ml of synthetic resin
Thiourea group content: 1.13 m mol/ml
Amino group content: 0.5 m mol/ml
Elemental analysis: 73.4% C; 9.2% N; 8.45% S. Practical Example 1
Determining breakthrough capacity for mercury in a fixedbed filter:
1000 ml of the synthetic resin produced in accordance with Example 6 in a glass filter tube were used for the tests. The layer height of the resin filling amounted to 71 cm. The solution which passed downwards onto the resin had the following compositions: 500 ppm of Hg (in the form of mercury chloride), and 1000 ppm of sodium chloride and hydrochloric acid varying in concentration (cf.Table). The filtration rate amounted to 7.1 m/hour. The mercury analyses were carried out by atom-absorption spectroscopy in the absence of a flame.

The breakthrough capacity (mercury absorption in g of Hg/l of resin) was determined for 3 pH settings and 2 breakthrough points (mercury content of effluent):

| pH of input | 5.5 | | 2 | | 1 | |
|---|---|---|---|---|---|---|
| Hg-content of effluent in ppb | <1 | <10 | <1 | <10 | <1 | <10 |
| Breakthrough capacity [g of Hg/l of resin] | 155 | 165 | 142 | 152 | 141 | 150 |

PRACTICAL EXAMPLE 2

Determining mercury leakage in fluidized-bed charging:

In the same apparatus as described above in Practical Example 1, 1000 ml of the synthetic resin produced in accordance with Example 6 were charged from beneath with a mercury solution of the following composition: 5ppm of Hg (in the form of mercury chloride), and 10 ppm of sodium chloride, pH 5 – 6. The filtration rate was initially adjusted to 7.1 m/hour, the entire quantity of resin forming a moving zone, and after 70 hours to 10.6 m/hour. The test was terminated after a further 120 hours. Throughout the entire duration of the test, no mercury could be detected in the filter effluent (mercury leakage <1 ppb).

PRACTICAL EXAMPLE 3

Determining breakthrough capacity for gold in a fixed-bed filter:

In a glass filter tube, a 0.01 N solution of tetrachlorauric acid in 1 N hydrochloric acid (1.97 g of gold per litre of solution) was filtered through a 10 ml sample of the synthetic resin produced in accordance with Example 10. The layer height of the resin filling amounted to 11 cm and the filtration rate was 2.2 m/hour. The breakthrough capacity of the resin was determined for a gold leakage of 1 ppm of gold in the effluent and 200 ppm (approximately 10% of the gold content of the input). The values were 143 mg of Au/ml of resin and 236 mg of Au/ml of resin.

What we claim is:

1. A thiourea group containing synthetic resin comprising a crosslinked macroporous vinyl aromatic matrix polymer of monovinyl and polyvinyl monomers, said polymer comprising from 50 to 99% by weight of polymerized monovinyl monomer and from 1 to 50% by weight of polymerized polyvinyl monomer and having a pore volume of from 20 to 80% by volume, a specific surface of 10 to 500 m²/g and having at least 10% of its aromatic nuclei substituted by from 1 to 3 functional groups of the formulae (I)     $-[(CH_2)_n-NR_1-\underset{\underset{S}{\|}}{C}-NR_2R_3]_x$, (II) and     $-[(CH_2)_n-NR_1H]_y$ (III)     $-[(CH_2)_n-NR_1-\underset{\underset{S}{\|}}{C}-NR_1-(CH_2)_n]_z$ wherein x, y and z are separately 0, 1, 2 or 3; n is 0, 1 or 2; $R_1$, $R_2$ and $R_3$ are separately hydrogen, alkyl having 1 to 6 carbon atoms, alkenyl having 2 to 6 carbon atoms, cycloalkyl having 5 to 6 carbon atoms, phenyl, naphthyl, benzyl or one of said phenyl, naphthyl, or benzyl radicals substituted by alkyl or alkoxy having 1 to 3 carbon atoms or halogen; the proportion of (I) being from 1 to 95%, the proportion of (II) being from 98 to 4% and the proportion of (III) being from 1 to 95% when x, y and z are other than 0 and the proportion of (I) being from 5 to 100% and the proportion of (II) being from 95 to 0% when z is 0, said porportional percentages being based on the sum of the total functional groups.

2. The synthetic resin of claim 1 wherein the pore volume is from 30 to 60% by volume.

3. The synthetic resin of claim 1 wherein said specific surface is from 20 to 200 m²/g.

4. The synthetic resin of claim 1 wherein at least one of $R_1$, $R_2$ and $R_3$ is substituted by said alkyl or alkoxy moiety having from 1 to 3 carbon atoms or halogen.

5. The synthetic resin of claim 1 wherein x, y and z are each other than 0, the proportion of (I) is from 10 to 60%, the proportion of (II) is from 85 to 10% and the proportion of (III) is from 5 to 80%.

6. The synthetic resin of claim 1 wherein the macroporous vinyl aromatic matrix polymer comprises from 85 to 98% by weight of polymerized monovinyl compound and from 2 to 15% by weight of polymerized polyvinyl compound.

7. The synthetic resin of claim 1 wherein said macroporous vinyl aromatic matrix polymer comprises from 50 to 98% by weight of polymerized styrene and from 2 to 50% by weight of polymerized divinylbenzene.

8. The synthetic resin of claim 1 wherein said macroporous vinyl aromatic matrix polymer comprises from 85 to 98% by weight of polymerized styrene and from 2 to 15% by weight of polymerized divinylbenzene.

9. The synthetic resin of claim 1 wherein the proportion of (I) is from 10 to 60%, the proportion of (III) is from 5 to 80% and the proportion of (II) is from 85 to 10%.

10. The synthetic resin of claim 1 having a porosity of from 30 to 60% by volume, a specific surface of 20 to 200 m²/g and having a proportion of (I) of from 5 to 100% and a proportion of (II) of form 95 to 0%, n being 1, $R_1$ and $R_2$ being hydrogen and $R_3$ being methyl, phenyl, allyl or benzyl.

11. The synthetic resin of claim 1 having a porosity of from 30 to 60% by volume, a specific surface of 20 to 200 m²/g and having a porportion of (I) of from 10 to 90% and a proportion of (II) of from 90 to 10%, n being 1, $R_1$ and $R_2$ being hydrogen and $R_3$ being methyl, phenyl, allyl or benzyl.

12. The synthetic resin of claim 1 having a porosity of from 30 to 60% by volume, a specific surface of 20 to 200 m²/g and having a proportion of (I) of from 5 to 100% and a proportion of (II) of from 95 to 0%, n being 1 and $R_1$, $R_2$ and $R_3$ being hydrogen.

13. The synthetic resin of claim 1 having a porosity of from 30 to 60% by volume, a specific surface of 20 to 200 m²/g and having a proportion of (I) of from 10 to 60% and a proportion of (II) of from 90 to 40%, $n$ being 1 and $R_1$, $R_2$ and $R_3$ being hydrogen.

14. The synthetic resin of claim 1 having a porosity of from 30 to 60% by volume, a specific surface of 20 to 200 m²/g and having a proportion of (III) of from 5 to 90% and a proportion of the sum of (I) and (II) of from 95 to 10%, $n$ being 1 and $R_1$, $R_2$ and $R_3$ each being hydrogen.

15. The synthetic resin of claim 1 having a porosity of from 30 to 60% by volume, a specific surface of 20 to 200 m²/g and having a proportion of (III) of from 50 to 90% and a proportion of the sum of (I) and (II) of from 50 to 10%, $n$ being 1 and $R_1$, $R_2$ and $R_3$ each being hydrogen.

16. A process for absorbing mercury, gold, silver and platinum compounds or mixtures thereof from solution which comprises employing the synthetic resin of claim 1.

* * * * *